US012473621B2

(12) United States Patent
Abukawa et al.

(10) Patent No.: US 12,473,621 B2
(45) **Date of Patent: *Nov. 18, 2025**

(54) HOT-ROLLED STEEL SHEET

(71) Applicant: NIPPON STEEL CORPORATION, Tokyo (JP)

(72) Inventors: Genki Abukawa, Tokyo (JP); Masafumi Azuma, Tokyo (JP); Shohei Yabu, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 592 days.

This patent is subject to a terminal disclaimer.

(21) Appl. No.: 17/800,490

(22) PCT Filed: Feb. 19, 2021

(86) PCT No.: PCT/JP2021/006417

§ 371 (c)(1),
(2) Date: Aug. 17, 2022

(87) PCT Pub. No.: WO2021/167079

PCT Pub. Date: Aug. 26, 2021

(65) Prior Publication Data

US 2023/0107809 A1 Apr. 6, 2023

(30) Foreign Application Priority Data

Feb. 20, 2020 (JP) ................................ 2020-026996

(51) Int. Cl.

| | |
|---|---|
| ***C22C 38/02*** | (2006.01) |
| ***B32B 15/01*** | (2006.01) |
| ***C21D 9/46*** | (2006.01) |
| ***C22C 38/00*** | (2006.01) |
| ***C22C 38/04*** | (2006.01) |
| ***C22C 38/06*** | (2006.01) |
| ***C22C 38/08*** | (2006.01) |
| ***C22C 38/12*** | (2006.01) |
| ***C22C 38/14*** | (2006.01) |
| ***C22C 38/20*** | (2006.01) |
| ***C22C 38/22*** | (2006.01) |
| ***C22C 38/38*** | (2006.01) |
| *C21D 7/13* | (2006.01) |

(52) U.S. Cl.

CPC ............ *C22C 38/38* (2013.01); *B32B 15/013* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/20* (2013.01); *C22C 38/22* (2013.01); *C21D 7/13* (2013.01); *C21D 9/46* (2013.01); *C21D 2211/001* (2013.01); *C21D 2211/002* (2013.01); *C21D 2211/008* (2013.01)

(58) Field of Classification Search

CPC ........................................................ C21D 9/46

See application file for complete search history.

(56) References Cited

U.S. PATENT DOCUMENTS

| | | | | |
|---|---|---|---|---|
| 12,215,402 | B2 * | 2/2025 | Abukawa | C21D 6/001 |
| 2013/0167985 | A1 | 7/2013 | Saito et al. | |
| 2013/0323112 | A1 | 12/2013 | Okamoto et al. | |
| 2014/0014236 | A1 | 1/2014 | Nozaki et al. | |
| 2020/0157666 | A1 * | 5/2020 | Sakakibara | C22C 38/005 |
| 2021/0140005 | A1 * | 5/2021 | Yoshida | C22C 38/58 |

FOREIGN PATENT DOCUMENTS

| | | | | |
|---|---|---|---|---|
| CA | 2 860 165 | A1 | 7/2013 | |
| CN | 103459647 | A | 12/2013 | |
| EP | 3 502 291 | A1 | 6/2019 | |
| JP | 2012-62558 | A | 3/2012 | |
| JP | 2012-77336 | A | 4/2012 | |
| JP | 2013-133499 | A | 7/2013 | |
| WO | WO2012/121219 | A1 | 9/2012 | |
| WO | WO-2018033960 | A1 * | 2/2018 | B21D 22/20 |
| WO | WO-2019009410 | A1 * | 1/2019 | C21D 9/46 |

OTHER PUBLICATIONS

Manabu Takahashi, "Development of High Strength Steels for Automobiles", Nippon Steel Technical Report, (2003), 378, pp. 2-6.

* cited by examiner

*Primary Examiner* — Jophy S. Koshy

(74) *Attorney, Agent, or Firm* — Birch, Stewart, Kolasch & Birch, LLP

(57) ABSTRACT

This hot-rolled steel sheet has a predetermined chemical composition, the microstructure includes, by volume percentage, 70% or more of martensite, tempered martensite, and bainite in total and 5% to 20% of residual austenite, in a surface layer region that is a range from a surface to a position at 1/10 of a sheet thickness, a sum of an average pole density of an orientation group consisting of {211}<111> to {111}<112> and a pole density of a crystal orientation of {110}<001> is 6.0 or less, a concentration of solid solution carbon in the residual austenite is 0.5 mass % or more, and a tensile strength is 980 MPa or more.

6 Claims, 1 Drawing Sheet

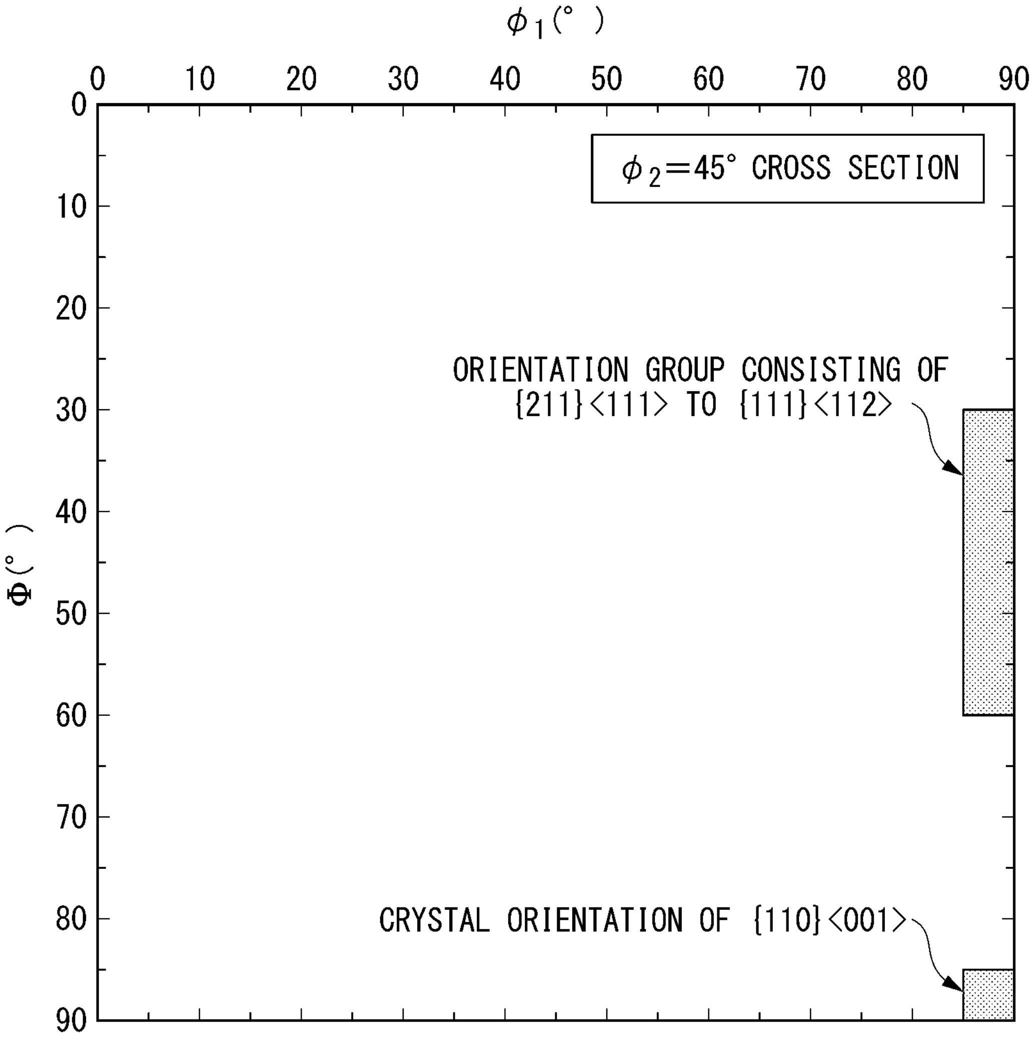
φ1(°)
0
10
20
30
40
50
60
70
80
90
Φ(°)
φ2=45° CROSS SECTION
ORIENTATION GROUP CONSISTING OF {211}<111> TO {111}<112>
CRYSTAL ORIENTATION OF {110}<001>

HOT-ROLLED STEEL SHEET

TECHNICAL FIELD OF THE INVENTION

The present invention relates to a hot-rolled steel sheet.

Priority is claimed on Japanese Patent Application No. 2020-026996, filed in Japan on Feb. 20, 2020, the content of which is incorporated herein by reference.

RELATED ART

In recent years, from the viewpoint of regulations for greenhouse gas emission in association with global warming countermeasures, there has been a demand for additional improvement in the fuel efficiency of vehicles. In addition, in order to reduce the weights of vehicle bodies and secure collision safety, the application of high strength steel sheets to components for a vehicle is becoming increasingly widespread.

However, for steel sheets that are used for components for a vehicle, not only strength but also a variety of workability that is required at the time of forming components such as press workability or weldability are required. Specifically, from the viewpoint of press workability or formability, bending workability and elongation are often required for steel sheets. However, since the formability of steel sheets tends to deteriorate with the high-strengthening of the materials, it is difficult to achieve both a high strength and favorable formability.

Therefore, for the application of high strength steel sheets to components for a vehicle, it has become an important problem to realize excellent bending workability and elongation together with a high strength of a tensile strength of 980 MPa or more.

It is reported in Non-Patent Document 1 that bending workability is improved by controlling the structure to a single structure of ferrite, bainite, martensite, or the like by microstructure control.

Patent Document 1 discloses a method for realizing a tensile strength of 590 MPa or more and 750 MPa or less and excellent bending workability by controlling a steel sheet containing, by mass %, 0.010% to 0.055% of C, 0.2% or less of Si, 0.7% or less of Mn, 0.025% or less of P, 0.02% or less of S, 0.01% or less of N, 0.1% or less of Al, and 0.06% to 0.095% of Ti to a structure including 95% or more of ferrite by an area ratio and controlling the diameters of carbide particles containing Ti in ferrite crystal grains and a structure in which only TiS having an average diameter of 0.5 μm or less is dispersed and precipitated as a sulfide containing Ti.

Patent Document 2 discloses a method for improving bending workability while maintaining a tensile strength of 780 MPa or more by, for a steel sheet containing, by mass %, 0.05% to 0.15% of C, 0.2% to 1.2% of Si, 1.0% to 2.0% of Mn, 0.04% or less of P, 0.0030% or less of S, 0.005% to 0.10% of Al, 0.01% or less of N, and 0.03% to 0.13% of Ti, controlling the structure inside the steel sheet to a bainite single phase or a structure including bainite in a fraction of more than 95% and setting, in the structure of the steel sheet surface layer area, bainite to a fraction of less than 80% and ferrite that is rich in workability to a fraction of 10% or more.

Furthermore, Patent Document 3 discloses that a high-strength hot-rolled steel sheet having a high strength of a yield strength of 960 MPa or more and excellent bending workability and being excellent in terms of low temperature toughness can be obtained by making the high-strength hot-rolled steel sheet contain, by mass %, 0.08% to 0.25% of C, 0.01% to 1.0% of Si, 0.8% to 1.5% of Mn, 0.025% or less of P, 0.005% or less of S, 0.005% to 0.10% of Al, 0.001% to 0.05% of Nb, 0.001% to 0.05% of Ti, 0.1% to 1.0% of Mo, and 0.1% to 1.0% of Cr and controlling the structure to a structure in which a tempered martensite is a primary phase with a volume percentage of 90% or more, the average grain size of prior austenite grains is 20 μm or less in a cross section parallel to a rolling direction, the average grain size of prior austenite grains is 15 μm or less in a cross section orthogonal to the rolling direction, and the anisotropy of the prior γ grains is reduced.

Patent Document 4 discloses that a hot-rolled steel sheet having excellent local deformability and a small anisotropy in bending workability can be obtained by controlling the pole density of each orientation of a specific crystal orientation group at the center portion in the sheet thickness, which is a range of 5/8 to 3/8 of the sheet thickness from the steel sheet surface and setting rC, which is the Lankford value in a direction perpendicular to a rolling direction, to 0.70 or more and 1.10 or less and r30, which is the Lankford value in a direction at an angle of 30° with respect to the rolling direction, to 0.70 or more and 1.10 or less.

PRIOR ART DOCUMENT

Patent Document

[Patent Document 1] Japanese Unexamined Patent Application, First Publication No. 2013-133499

[Patent Document 2] Japanese Unexamined Patent Application, First Publication No. 2012-62558

[Patent Document 3] Japanese Unexamined Patent Application, First Publication No. 2012-77336

[Patent Document 4] PCT International Publication No. WO2012/121219

Non-Patent Document

[Non-Patent Document 1] Takahashi et al., Nippon Steel Technical Report, "Development of High Strength Steels for Automobiles", No. 378, p. 2 to p. 6, (2003).

DISCLOSURE OF THE INVENTION

Problems to be Solved by the Invention

As described above, in recent years, there has been a demand for increasing the strengths of steel sheets and then further improving the bending workability and the elongation. However, it cannot be said that both the strength and the bending workability and the elongation are sufficiently satisfied with the above-described techniques of Patent Documents 1 to 4.

An object to be solved by the present invention is to provide a high-strength hot-rolled steel sheet being excellent in terms of the bending workability and the elongation and having a tensile strength of 980 MPa or more.

The above-described bending workability is an index indicating the unlikelihood of cracks being initiated in a processed portion during bending or an index indicating the unlikelihood of the cracks growing. However, in the present invention, unlike the related art, the bending workability relates to cracks (inside bend cracks) being initiated from the inside of the bending portion during bending.

Means for Solving the Problem

The present inventors studied the above-described object. As a result, it was found that, when the microstructure includes, by volume percentage, 70% or more of martensite, tempered martensite and bainite in total and 5 to 20% of residual austenite, it is possible to manufacture a steel sheet having a tensile strength of 980 MPa or more while securing workability.

In addition, the present inventors intensively investigated the bending workability of high strength steel sheets. As a result, it was clarified that, as the strengths of the steel sheets increase, it becomes easier for cracks to be initiated during bending. In addition, regarding cracking during the bending of a steel sheet, in the related art, it is usual that cracks are initiated from the surface of the steel sheet or the vicinity of the end surface on the outside bend, but it was found that, in association with the high-strengthening of steel sheet, there is a case where minute cracks are initiated in the inside bend. From findings in the related art, no method for suppressing such minute cracks that are initiated in the inside bend (hereinafter, referred to as inside bend cracks) has been found.

From research by the present inventors, it was found that the inside bend cracks are likely to be initiated in steel sheets having a tensile strength of 780 MPa class or higher, becomes significant in steel sheets having a tensile strength of 980 MPa class or higher, and becomes a more significant problem in steel sheets having a tensile strength of 1180 MPa class or higher.

The present inventors presumed that the mechanism of the initiation of the above-described inside bend cracks is attributed to the unevenness of deformation and examined a method for suppressing the inside bend cracks with attention paid to texture and uniformity of hardness.

As a result, it was found that, when the texture is relatively random, deformation resistance is also uniform, and thus deformation is likely to occur uniformly; however, when a specific texture develops, unevenness of deformation is caused between crystals having an orientation in which the deformation resistance is large and crystals having the other orientations, which promotes generation of a shear deformation band. Conversely, when crystals having an orientation in which the deformation resistance is large are reduced, deformation occurs uniformly and the shear deformation band is less likely to be generated. That is, the present inventors found that the inside bend cracks can be suppressed by controlling the texture particularly in the surface layer region in the sheet thickness direction where cracks are initiated.

The present invention has been made based on the above-described findings, and the gist of the present invention is as follows.

(1) A hot-rolled steel sheet according to one aspect of the present invention containing, as a chemical composition, by mass %, C: 0.02% to 0.30%, Si: 0.01% to 2.50%, Mn: 1.00% to 3.00%, P: 0.100% or less, S: 0.0001% to 0.0100%, Al: 0.005% to 1.000%, N: 0.010% or less, Ti: 0% to 0.20%, Nb: 0% to 0.20%, V: 0% to 0.200%, Ni: 0% to 2.00%, Cu: 0% to 2.00%, Cr: 0% to 2.00%, Mo: 0% to 2.00%, W: 0% to 0.100%, B: 0% to 0.0100%, REM: 0% to 0.0300%, Ca: 0% to 0.0300%, Mg: 0% to 0.0300%, and a remainder of Fe and impurities, in which the chemical composition satisfies Si+Al≥1.00%, a microstructure includes, by volume percentage, 70% or more of martensite, tempered martensite, and bainite in total and 5% to 20% of residual austenite, in a surface layer region that is a range from a surface to a position at 1/10 of a sheet thickness, a sum of an average pole density of an orientation group consisting of {211}<111> to {111}<112> and a pole density of a crystal orientation of {110}<001> is 6.0 or less, a concentration of solid solution carbon in the residual austenite is 0.5 mass % or more, and a tensile strength is 980 MPa or more.

(2) The hot-rolled steel sheet according to (1) may contain, as the chemical composition, by mass %, one or more selected from Ti: 0.001% to 0.20%, Nb: 0.001% to 0.20%, V: 0.001% to 0.200%, Ni: 0.01% to 2.00%, Cu: 0.01% to 2.00%, Cr: 0.01% to 2.00%, Mo: 0.01% to 2.00%, W: 0.005% to 0.100%, B: 0.0005% to 0.0100%, REM: 0.0003% to 0.0300%, Ca: 0.0003% to 0.0300%, and Mg: 0.0003% to 0.0300%.

(3) The hot-rolled steel sheet according to (1) or (2) may further include a hot-dip galvanized layer on the surface.

(4) The hot-rolled steel sheet according to (3), in which the hot-dip galvanized layer may be a hot-dip galvannealed layer.

Effects of the Invention

According to the above-described aspect of the present invention, it is possible to obtain a hot-rolled steel sheet that has a tensile strength of 980 MPa or more, is capable of suppressing the initiation of inside bend cracks, and is excellent in terms of bending workability and elongation.

BRIEF DESCRIPTION OF THE DRAWINGS

FIG. 1 is a diagram showing crystallite orientation distribution functions (ODF) in a cross section with $\phi2=45°$ and an orientation group consisting of {211}<111> to {111}<112> and a {110}<001> orientation.

EMBODIMENTS OF THE INVENTION

Hereinafter, a hot-rolled steel sheet according to an embodiment of the present invention (the steel sheet according to the present embodiment) will be described.

1. Microstructure

<Including 70% or More of Martensite, Tempered Martensite, and Bainite in Total and 5% to 20% of Residual Austenite, by Volume Percentage>

First, the reasons for limiting the microstructure will be described.

In the steel sheet according to the present embodiment, the primary phase of the microstructure is 70% or more of one or more selected from martensite, tempered martensite and bainite by volume percentage. The microstructure further includes 5% to 20% of residual austenite.

The steel sheet according to the present embodiment includes one or more selected from martensite, tempered martensite, and bainite, which are low temperature transformation-forming primary phases, in order to satisfy both a tensile strength (TS) of 980 MPa or more and bending workability. When an attempt is made to increase the strength in a structural configuration with a low total volume percentage of martensite, tempered martensite, and/or bainite, unevenness of deformation is caused between the above-described full hard structure and soft structures other than the above-described structure, and the bending workability deteriorates. When the total volume percentage of martensite, tempered martensite and/or bainite is less than 70%, a sufficient strength cannot be obtained or sufficient bending workability cannot be obtained.

In addition, the steel sheet according to the present embodiment includes 5% or more of residual austenite by volume percentage in order to obtain excellent elongation. When the volume percentage of residual austenite is less than 5%, sufficient elongation cannot be obtained. On the other hand, when a manufacturing condition where more than 20% of residual austenite is left is selected, other desired structures or strengths cannot be obtained. Therefore, the practical upper limit of the volume percentage of residual austenite is 20%.

The remainder other than the above-described structures may be one or more of ferrite and pearlite.

In the present embodiment, regarding the volume percentages of pearlite, bainite, tempered martensite, and ferrite, a sample is collected such that a cross section in the sheet thickness direction parallel to a rolling direction of the hot-rolled steel sheet serves as an observed section, the observed section is polished and Nital-etched, a range of ⅛ to ⅜ of the sheet thickness (⅛ thickness to ⅜ thickness) from the surface in which a position of a ¼ depth (¼ thickness) of the sheet thickness from the surface is centered is observed using a field emission scanning electron microscope (FE-SEM) at a magnification of 5000 times, the area ratio of each structure is measured, and the area ratio is regarded as the volume percentage. At that time, the area ratios are measured at 10 visual fields, and the average value thereof is regarded as the volume percentage.

Each structure has the following characteristics. Therefore, in the measurement of the area ratio, each structure is identified based on the following characteristics, and the area ratio is obtained.

Ferrite is equiaxed grains containing no iron-based carbides, and pearlite is a layered structure of ferrite and cementite.

Bainite includes upper bainite and lower bainite, and the upper bainite is a aggregation of lath-shaped crystal grains and an aggregate of laths containing a carbide between the laths. The lower bainite is a aggregation of lath-shaped crystal grains and contains an iron-based carbide having a major axis of 5 nm or more therein, and the carbide belongs to a single variant, that is, a group of iron-based carbides elongated in the same direction. Here, the group of iron-based carbides elongated in the same direction means that the difference in the elongation direction of the iron-based carbide group is within 5°.

Tempered martensite is a aggregation of lath-shaped crystal grains and contains an iron-based carbide with a major axis of 5 nm or more therein, and the carbide belongs to a plurality of variants, that is, a group of iron-based carbides elongated in two or more directions. Usually, tempered martensite refers to structures containing an iron-based carbide such as cementite in many cases; however, in the present embodiment, martensite including a fine precipitate containing Ti is also defined as tempered martensite.

Martensite (fresh martensite) and residual austenite are not sufficiently corroded by Nital etching and thus can be clearly distinguished from the above-described structures (ferrite, pearlite, bainite, and tempered martensite) in the observation with the FE-SEM. Therefore, the volume percentage of martensite can be obtained as a difference between the volume percentage obtained as the area ratio of a non-corroded region that is observed with the FE-SEM and the volume percentage of residual austenite measured with X-rays described below.

The volume percentage of the residual austenite is obtained by an X-ray diffraction method. Specifically, in the cross section in the sheet thickness direction parallel to the rolling direction at the ¼ depth position of the sheet thickness of the steel sheet, the integrated intensities of a total of six peaks of α(110), α(200), α(211), γ(111), γ(200), and γ(220) are obtained using Co-Kα rays, and the volume percentage of the residual austenite is obtained by calculation using an intensity averaging method.

However, in the steel sheet according to the present embodiment, only the total volume percentage of martensite, tempered martensite, and bainite needs to be specified, and it is not essential to distinguish these structures.

<Concentration of Solid Solution Carbon in Residual Austenite being 0.5 Mass % or More>

When the concentration of solid solution carbon in residual austenite is set to 0.5 mass % or more, residual austenite is appropriately stabilized, a large amount of transformation-induced plastic property (TRIP) is likely to be generated in a high strain region in the late deformation stage, and the elongation and bending workability of the steel sheet improve. Therefore, the concentration of solid solution carbon in residual austenite is set to 0.5 mass % or more. The concentration of solid solution carbon in residual austenite is preferably 0.7 mass % or more.

When the concentration of solid solution carbon in residual austenite to 2.0 mass % or less, it is possible to suppress excessive stabilization of residual austenite and to more reliably develop transformation-induced plastic property (TRIP). Therefore, the concentration of solid solution carbon in residual austenite is preferably set to 2.0 mass % or less.

The concentration of solid solution carbon in residual austenite is obtained by X-ray diffraction. Specifically, X-ray analysis with Cu-Kα rays is performed on the metallographic structure at a depth of ¼ of the sheet thickness from the surface of the steel sheet in the cross section in the sheet thickness direction parallel to the rolling direction at the central position in the sheet width direction, the lattice constant a (unit: angstrom) is obtained from the reflection angles of the (200) plane, (220) plane, and (311) plane of residual austenite, and the concentration of solid solution carbon (Cy) in residual austenite is calculated according to the following Equation (A).

$$C\gamma=(a-3.572)/0.033 \quad (A)$$

<In surface layer region that is range from surface to position at 1/10 of sheet thickness, sum of average pole density of orientation group consisting of {211}<111> to {111}<112> and pole density of crystal orientation of {110}<001> being 6.0 or less>

The present inventors intensively investigated the bending workability of high strength steel sheets. As a result, it was found that minute cracks may be initiated in inside bends in association with the high-strengthening of the steel sheets. As a result of additional studies. the mechanism of such inside bend cracks is presumed as follows.

At the time of bending, compressive stress is generated in the inside bend. In the beginning, the working proceeds while the entire inside bend is uniformly distorted; however, as the working amount increases, deformation becomes too significant to be carried by uniform deformation alone, and microscopic unevenness of deformation is caused (the generation of a shear deformation band). As this shear deformation band further grows, cracks are initiated along the shear band from the surface of the inside bend and propagates. It is presumed that the reason for the inside bend cracks to be more likely to be initiated in association with high-strengthening is that deterioration of work hardening capability in association with high-strengthening makes it difficult for uniform deformation to proceed and makes it easy for unevenness of deformation to be caused, which generates a shear deformation band at an early stage of the working (or under moderate working conditions).

When the steel sheet is bent and deformed, the strain increases toward the surface with the center of the sheet thickness as the boundary, and the strain becomes maximum at the outermost surface. Therefore, cracks of inside bend cracks are initiated on the surface of the steel sheet. Since the structure of the surface layer region that is a range from the surface of the steel sheet to 1/10 of the sheet thickness in the sheet thickness direction contributes to such initiation of cracks, the structure of the surface layer region is controlled.

The present inventors paid attention to the texture in order to suppress the unevenness of deformation that acts as the cause for the inside bend cracks during bending.

Specifically, when the steel sheet is distorted, the responsiveness of a slip system against deformation in each crystal orientation differs (Schmid factor). This is considered to be because deformation resistance differs in each crystal orientation. That is, when the texture is relatively random, the deformation resistance is also uniform, and thus deformation is likely to occur uniformly; however, when a specific texture develops, unevenness of deformation is caused between crystals having an orientation in which the deformation resistance is large and crystals having the other orientations and a shear deformation band is likely to be generated. Conversely, it is considered that, when crystals having an orientation in which the deformation resistance is large are reduced, deformation occurs uniformly, and the shear deformation band is less likely to be generated.

In the steel sheet according to the present embodiment, based on the above-described idea, in a surface layer region that is a range from the surface of the steel sheet to a position at 1/10 of the sheet thickness, the sum of the average pole density of an orientation group consisting of {211}<111> to {111}<112> and the pole density of a crystal orientation of {110}<001> is set to 6.0 or less. This makes it possible to suppress the inside bend cracks.

In the case of a steel sheet where development of texture differs on the front and back surfaces, if the texture that is specified in the present embodiment is satisfied even in a range from the surface on one side to the position at 1/10 of the sheet thickness alone, it is possible to obtain the inside bend crack suppression effect in bending where the surface becomes the inside bend.

The orientation group consisting of {211}<111> to {111}<112> and the crystal orientation of {110}<001> are orientations that easily develop in the surface layer regions of high-strength hot-rolled steel sheets produced by a common method. In addition, these orientations are orientation groups where deformation resistance is particularly large in inside bends during bending, and thus a shear deformation band is likely to be generated due to a difference in deformation resistance from other orientation groups. Therefore, the inside bend cracks can be suppressed by reducing the pole densities of these orientation groups. Here, when only any one of the average pole density of the orientation group consisting of {211}<111> to {111}<112> and the pole density of the crystal orientation of {110}<001> is reduced, the effect of the present embodiment cannot be obtained, and it is important to reduce the sum thereof.

When the sum of the average pole density of the orientation group consisting of {211}<111> to {111}<112> and the pole density of the crystal orientation of {110}<001> is more than 6.0 in the surface layer region that is a range from the surface of the steel sheet to 1/10 of the sheet thickness, the shear deformation band is significantly likely to be generated, which acts as a cause for the initiation of inside bend cracks. In this case, R/t, which is the average value of the minimum bend radii in an L axis and in a C axis/the sheet thickness, exceeds 1.5. Therefore, the sum thereof is set to 6.0 or less. From this viewpoint, the sum of the average pole density of the orientation group consisting of {211}<111> to {111}<112> and the pole density of the crystal orientation of {110}<001> is preferably 5.0 or less and more preferably 4.0 or less.

The sum of the average pole density of the orientation group consisting of {211}<111> to {111}<112> and the pole density of the crystal orientation of {110}<001> is preferably as small as possible, but it is difficult to set the sum to less than 0.5 in high-strength hot-rolled steel sheets of 980 MPa or more, and thus the practical lower limit is 0.5.

The pole density can be measured by an electron backscatter diffraction pattern (EBSP) method. In a sample to be subjected to analysis by the EBSP method, a cut surface parallel to the rolling direction and perpendicular to the sheet surface is mechanically polished, and strain is removed by chemical polishing, electrolytic polishing, or the like after the mechanical polishing. Using this sample, the measurement intervals are set to 4.0 μm in the range from the surface of the steel sheet to the position at 1/10 of the sheet thickness, and the analysis by the EBSP method is performed such that the measurement area becomes 150000 $\mu m^2$ or larger.

FIG. 1 shows crystallite orientation distribution functions (ODF) at a ϕ2=45° cross section, the orientation group consisting of {211}<111> to {111}<112>, and the orientation {110}<001>. The orientation group consisting of {211}<111> to {111}<112> refers to a range where the texture analysis is Bunge-expressed and the crystallite orientation distribution functions (ODF) at the ϕ2=45° cross section are ϕ1=85° to 90°, Φ=30° to 60°, and ϕ2=45°. The average pole density of this orientation group is calculated in the above-described range shown in FIG. 1. Strictly speaking, the {211}<111> to {111}<112> orientation group is a range of ϕ1=90°, Φ=30° to 60°, and ϕ2=45° on ODF. However, since there is a measurement error arising from test piece working or sample setting, in the steel sheet according to the present embodiment, the average pole density is calculated in a range of ϕ1=85° to 90°, Φ=30° to 60°, and ϕ2=45°. In the following average pole density analyses as well, angular ranges from which the average value is taken are determined in the same manner in consideration of a measurement error arising from test piece working or sample setting.

Similarly, the pole density of the crystal orientation of {110}<001> refers to a range where the crystallite orientation distribution functions (ODF) at the ϕ2=45° cross section are ϕ1=85° to 90°, Φ=85° to 90°, and ϕ2=45°. The pole density of this crystal orientation is calculated in the above-described range shown in FIG. 1.

Here, for the crystal orientation of the rolled sheet, a lattice plane parallel to the sheet surface is normally expressed by (hid) or {hkl}, and an orientation parallel to the rolling direction is expressed by [uvw] or <uvw>. {hkl} and <uvw> are general terms for equivalent lattice planes and directions, and (uvw) and [hkl] refer to individual lattice planes and directions. That is, in the steel sheet according to the present embodiment, the bcc structure is covered, and thus, for example, (110), (−110), (1−10), (−1−10), (101), (−101), (10−1), (−10−1), (011), (0−11), (01−1), and (0−1−1) are equivalent lattice planes and cannot be distinguished. In this case, these lattice planes are collectively referred to as {110}.

2. Chemical Composition

Hereinafter, the chemical composition of the steel sheet according to the present embodiment will be described in detail.

Numerical limitation ranges described below using "to" include values at both ends of the ranges as the lower limit value and the upper limit value. However, numerical values expressed with 'more than' or 'less than' are not included in numerical ranges. "%" relating to the amount of each element indicates "mass %" unless otherwise described.

(C: 0.02% to 0.30%)

C is an element effective for increasing the strength of the steel sheet. When the C content is less than 0.02%, it is difficult to secure a strength of 980 MPa or more. Therefore, the C content is set to 0.02% or more. The C content is preferably 0.13% or more and more preferably 0.15% or more.

On the other hand, when the C content exceeds 0.30%, not only is the effect saturated, but also pearlite is preferentially formed, which makes the formation of bainite and residual austenite insufficient, and it becomes difficult to obtain a desired volume percentage of bainite and a desired volume percentage of residual austenite. Therefore, the C content is 0.30% or less. The C content is preferably 0.25% or less.

(Si: 0.01% to 2.50%)

Si is an important element capable of increasing the material strength by solid solution strengthening. When the Si content is less than 0.01%, the strength decreases. Therefore, the Si content is set to 0.01% or more. The Si content is preferably 0.10% or more and more preferably 0.30% or more.

On the other hand, when the Si content is more than 2.50%, the surface properties deteriorate. Therefore, the Si content is set to 2.50% or less. The Si content is preferably 2.00% or less.

(Mn: 1.00% to 3.00%)

Mn is an effective element for increasing the strength of the steel sheet by increasing the volume percentage of bainite and martensite in the microstructure of the steel sheet. In order to set the volume percentage of bainite, martensite, and tempered martensite to 70% or more in total, the Mn content is set to 1.00% or more. When the Mn content is less than 1.00%, the volume percentage of these structures decreases, and a sufficient strength cannot be obtained.

On the other hand, when the Mn content is more than 3.00%, the effect is saturated, and the economic efficiency deteriorates. Therefore, the Mn content is set to 3.00% or less.

(P: 0.100% or less)

P is an element that is segregated in the sheet thickness center portion of the steel sheet and also an element that embrittles welded portions. The P content is preferably as low as possible, and, when the P content becomes more than 0.100%, the characteristics significantly deteriorate, and thus the P content is limited to 0.100% or less. The P content is preferably 0.050% or less.

On the other hand, the effect is exhibited without particularly specifying the lower limit (the P content may be 0%), but it is economically disadvantageous to reduce the P content to less than 0.001%. Therefore, the P content may be set to 0.001% or more.

(S: 0.0001% to 0.0100%)

S is an element that causes embrittlement of slabs by being present as a sulfide. In addition, S is an element that degrades the formability of the steel sheet. Therefore, the S content is limited. When the S content exceeds 0.010%, the characteristics significantly deteriorate, and thus the S content is set to 0.010% or less.

On the other hand, the effect is exhibited without particularly specifying the lower limit (the S content may be 0%), but it is economically disadvantageous to reduce the S content to less than 0.0001%, and thus the S content is set to 0.0001% or more.

(N: 0.010% or less)

N is an element that forms a coarse nitride and degrades the bending workability or the elongation. When the N content exceeds 0.010%, the bending workability or the elongation significantly deteriorates. Therefore, the N content is set to 0.010% or less.

On the other hand, the lower limit of the N content does not need to be particularly specified (the N content may be 0%); however, when the N content is reduced to less than 0.0001%, the manufacturing cost significantly increases. Therefore, from the viewpoint of the manufacturing cost, the N content may be set to 0.0001% or more or may be set to 0.0005% or more.

(Al: 0.005% to 1.000%)

Al is an effective element for microstructure control and deoxidation in hot rolling. In order to obtain these effects, the Al content is set to 0.005% or more. When the Al content is less than 0.005%, a sufficient deoxidation effect cannot be obtained, and a large amount of an inclusion (oxide) is formed in the steel sheet. Such an inclusion acts as a starting point of cracking during bending or stretch flanging and degrades workability.

On the other hand, when the Al content exceeds 1.000%, slabs become brittle, which is not preferable. Therefore, the Al content is set to 1.000% or less.

In the present embodiment, the Al content means the acid soluble Al (sol. Al) content.

In addition, in order to secure the area ratio of residual austenite, the total amount of Si and Al (Si+Al) is set to 1.00% or more.

What has been described above is the basic chemical composition of the steel sheet according to the present embodiment, the chemical composition of the steel sheet according to the present embodiment contains the above-described elements, and the remainder may consist of Fe and impurities. In the present embodiment, the impurities mean substances that are incorporated from ore as a raw material, a scrap, manufacturing environment, or the like and are permitted to an extent that the steel sheet according to the present embodiment are not adversely affected.

For the purpose of improving a variety of characteristics, the steel sheet according to the present embodiment may further contain components as follows. The following elements do not need to be necessarily contained, and thus the lower limits of their contents are 0%.

(Ti: 0% to 0.20%)

(Nb: 0% to 0.20%)

(V: 0% to 0.200%)

Ti (titanium), Nb (niobium), and V (vanadium) are elements that contribute to increase in the strength. Therefore, Ti, Nb, and/or V may be contained. In order to preferably obtain the above-described effect, the amount of each is preferably 0.001% or more. The Ti content is more preferably 0.02% or more, and the Nb content is more preferably 0.01% or more.

On the other hand, even when more than 0.20% of Ti, more than 0.20% of Nb, and more than 0.200% of V are contained, not only is the effect of the above-described action saturated, but there is a case where it becomes economically disadvantageous to contain such components. Therefore, in a case where Ti, Nb, and V are contained, the Ti content is set to 0.20% or less, the Nb content is set to 0.20% or less, and the V content is set to 0.200% or less. The Ti content and Nb content are preferably 0.15% or less and more preferably 0.10% or less, and the V content is preferably 0.150% or less and more preferably 0.100% or less.

(Ni: 0% to 2.00%)

(Cu: 0% to 2.00%)

(Cr: 0% to 2.00%)

(Mo: 0% to 2.00%)

Ni, Cu, Cr, and Mo are elements that contribute to the high-strengthening of the steel sheet through microstructure control in hot rolling. This effect becomes significant when one or more of Ni, Cu, Cr, and Mo are contained, and, at this time, the amount of each element is 0.01% or more. Therefore, in the case of obtaining the effect, the amount of each element is preferably set to 0.01% or more.

On the other hand, when the amount of each element exceeds 2.00%, weldability, hot workability, and the like deteriorate. Therefore, in the case of being contained, the amount of each of Ni, Cu, Cr, and Mo is set to 2.00% or less.

(W: 0% to 0.100%)

W is an element that contributes to increase in the strength of the steel sheet through precipitation hardening. In the case of obtaining this effect, the W content is preferably set to 0.005% or more.

On the other hand, when the W content exceeds 0.100%, not only is the effect saturated, but the hot workability also deteriorates. Therefore, in a case where W is contained, the W content is set to 0.100% or less.

(B: 0% to 0.0100%)

B is an effective element for controlling transformation in hot rolling and improving the strength of the steel sheet through structure strengthening. In the case of obtaining this effect, the B content is preferably set to 0.0005% or more.

On the other hand, when the B content becomes more than 0.0100%, not only is the effect saturated, but an iron-based boride is also precipitated, which makes an effect of the solid solution of B on hardenability improvement lost. Therefore, even in a case where B is contained, the B content is set to 0.0100% or less. The B content is preferably 0.0080% or less and more preferably 0.0050% or less.

(REM: 0% to 0.0300%)

(Ca: 0% to 0.0300%)

(Mg: 0% to 0.0300%)

REM, Ca, and Mg are elements that contribute to increase in the strength of the steel sheet. When the total amount of one or more of REM, Ca, and Mg is less than 0.0003%, a sufficient effect cannot be obtained, and thus, in a case where the effect is obtained, the total amount of REM, Ca, and Mg is preferably set to 0.0003% or more.

On the other hand, when REM, Ca, and Mg each exceed 0.0300%, castability or hot workability deteriorates. Therefore, in a case where REM, Ca, and Mg are contained, the amount of each element is set to 0.0300% or less.

In the present embodiment, REM refers to a total of 17 elements consisting of Sc, Y, and lanthanoids, and the REM content refers to the total of the amounts of these elements. Industrially, lanthanoids are added in a mischmetal form.

The above-described steel composition may be measured by a usual analysis method of steel. For example, the steel composition may be measured using inductively coupled plasma-atomic emission spectrometry (ICP-AES). C and S may be measured using an infrared absorption method after combustion, N may be measured using an inert gas fusion-thermal conductivity method, and O may be measured using an inert gas fusion-nondispersive infrared absorption method.

The steel sheet according to the present embodiment may further include a hot-dip galvanized layer on the surface. In addition, the hot-dip galvanizing may be a hot-dip galvannealed layer on which an alloying treatment has been performed.

Since galvanizing contributes to improvement in corrosion resistance, in the case of applying the steel sheet to uses where corrosion resistance is expected, it is desirable to perform galvanizing to produce a hot-dip galvanized steel sheet or a galvannealed steel sheet.

Since there is a concern that suspension components of vehicles may be perforated by corrosion, there is a case where it is not possible to thin the steel sheet to a certain sheet thickness or less even after high-strengthening. Since one of the purposes of the high-strengthening of the steel sheet is weight reduction by thinning, even when a high strength steel sheet is developed, if the high strength steel sheet has poor corrosion resistance, regions to which the high strength steel sheet can be applied are limited. As a method for solving this problem, it can be considered to perform plating such as highly corrosion-resistant hot-dip galvanizing on the steel sheet. In the steel sheet according to the present embodiment, the steel sheet components are controlled as described above, and thus hot-dip galvanizing is possible.

The plating may be electrogalvanizing or the plating may be plating containing Si, Al and/or Mg in addition to Zn.

4. Mechanical Properties

The steel sheet according to the present embodiment has, as a sufficient strength that contributes to the weight reduction of vehicles, a tensile strength (TS) of 980 MPa or more. The tensile strength is preferably 1180 MPa or more. The upper limit of the tensile strength does not need to be particularly specified, and, in the present embodiment, the practical upper limit of the tensile strength may be set to 1370 MPa.

In addition, an object of the steel sheet according to the present embodiment is that the limit bend R/t value, which serves as an index value of inside bend cracks, is 1.5 or less. The R/t value can be obtained by, for example, cutting out a strip-shaped test piece from a ½ position in the width direction of the hot-rolled steel sheet, performing bending according to JIS Z 2248: 2006 (V block 90° bending test) for both a bend where the bending ridge is parallel to the rolling direction (L direction) (L-axis bending) and a bend where the bending ridge is parallel to the direction perpendicular to the rolling direction (C direction) (C-axis bending), and investigating cracks initiated in the inside bend. The minimum bend radii at which cracks are not initiated are obtained, and a value obtained by dividing the average value of the minimum bend radii in the L axis and in the C axis by the sheet thickness is regarded as the limit bend R/t and used as an index value of bending workability.

In addition, another object of the steel sheet according to the present embodiment is that, as an index of having high elongation, the product of the tensile strength TS (MPa) and EL (%) is 19000 (MPa %) or more. The product of TS and EL is preferably 19120 (MPa %) or more and more preferably 19600 (MPa %) or more. In the steel sheet according to the present embodiment, furthermore, the total elongation EL is desirably 16.0% or more.

In a tensile test, JIS No. 5 tensile test piece is collected according to JIS Z 2241: 2011 such that a direction perpendicular to the rolling direction becomes the tensile direction, and the tensile strength (TS) and the total elongation (EL) are measured.

5. Manufacturing Method

Next, a preferable method for manufacturing the steel sheet according to the present embodiment will be described.

In order to control the microstructure and the texture in the surface layer region of the steel sheet within the above-described ranges, the hot-rolled steel sheet is preferably manufactured under conditions that a hot rolling step (including a heating step, a rough rolling step, and a finish rolling step), a cooling step, and a heat treatment step are included, a coiling step, a pickling step, and a light rolling reduction step are included as necessary between the cooling step and the heat treatment step, and a plating step is included as necessary after the heat treatment step.

Hereinafter, preferable conditions in each step will be described.

A manufacturing step preceding hot rolling is not particularly limited. That is, subsequent to melting with a blast furnace, an electric furnace, or the like, a variety of secondary smelting may be performed, and then casting may be performed by a method such as normal continuous casting or casting by an ingot method. In a case of continuous casting, a cast slab may be cooled to a low temperature, then, heated again and then hot-rolled or a cast slab may be hot-rolled as it is after casting without being cooled to a low temperature. Scrap may be used as a raw material.

<Heating Step>

In the heating step, a slab having the above-described chemical composition that is subjected to the rough rolling step is heated to 1200° C. or higher. A coarse precipitate precipitated in the slab (such as an iron-based carbide, a carbonitride of an alloying element, or the like) has a possibility of impairing material stability. Therefore, the slab is heated to 1200° C. or higher for the purpose of dissolving such a precipitate.

<Rough Rolling Step>

Next, the heated slab is rough-rolled to produce a rough-rolled sheet.

In the rough rolling step, the thickness of the rough-rolled sheet after the rough rolling is controlled to more than 35 mm and 45 mm or less. The thickness of the rough-rolled sheet affects the degree of the temperature decreased from the tip end to the tail end of the rolled sheet that is caused from the start of rolling to the completion of the rolling in the finish rolling step. In addition, when the thickness of the rough-rolled sheet is 35 mm or less or more than 45 mm, the amount of strain that is introduced into the steel sheet during finish rolling, which is the next step, changes, and the worked structure that is formed during the finish rolling changes. As a result, the recrystallization behavior changes, which makes it difficult to obtain a desired texture. In particular, it becomes difficult to obtain the above-described texture in the steel sheet surface layer region.

It is usual to appropriately set the thickness of the rough-rolled sheet after the rough rolling from the viewpoint of productivity or the like, and it is not usual to set the thickness to control the characteristics of the steel sheet. However, the present inventors have strictly controlled the thickness of the rough-rolled sheet in order to control the texture in the steel sheet surface layer region.

<Finish Rolling Step>

Subsequent to the rough rolling, multi-stand finish rolling is performed. The present inventors found that it is important to control the sheet thickness, the roll shape ratio, the temperature, and the amounts of Nb and Ti in steel during rolling in the final two stands of rolling in the finish rolling step for hot rolling, which have usually not been positively controlled, to appropriate ranges derived by a certain calculation equation in terms of controlling the texture.

Therefore, in this multi-stand finish rolling, the finish rolling start temperature is 1000° C. or higher and 1150° C. or lower, and the thickness of the steel sheet (thickness of the rough-rolled sheet) before the start of finish rolling is more than 35 mm and 45 mm or less. In addition, in the rolling one stand before the final stand of the multi-stand finish rolling, the rolling temperature is 960° C. or higher and 1020° C. or lower, and the rolling reduction is larger than 11.0% and 23.0% or smaller. In addition, in the final stand of the multi-stand finish rolling, the rolling temperature is preferably 930° C. or higher and 995° C. or lower, and the rolling reduction is preferably larger than 11.0% and 22.0% or smaller. In addition, it is preferable that each condition at the time of the final two stands of rolling is controlled and a texture forming parameter co that is calculated by the following equation 1 satisfies 110 or less. Furthermore, the finish rolling is preferably performed under a condition that the total rolling reduction of the final three stands of the multi-stand finish rolling is 35% or more.

[Equation 1]

$$\omega = 0.3\left[\frac{\{1.2\times10^{4}/F_1^{*} + 600(Sr_1 - 0.9)\}}{FT_1^{*}} + \frac{\{800/F_2^{*} + 400(Sr_2 - 0.9)\}}{FT_2^{*}}\right] \quad \text{(Equation 1)}$$

[Equation 2]

$$PE = \begin{cases} 0.01 & (Ti + 1.3Nb < 0.02) \\ Ti + 1.3Nb - 0.01 & (Ti + 1.3Nb \geq 0.02) \end{cases} \quad \text{(Equation 2)}$$

[Equation 3]

$$F_1^{*} = \begin{cases} 1.0 & (F_1 < 12) \\ F_1 - 11 & (F_1 \geq 12) \end{cases} \quad \text{(Equation 3)}$$

[Equation 4]

$$F_2^{-} = \begin{cases} 0.1 & (F_2 < 11.1) \\ F_2 - 11 & (F_2 \geq 11.1) \end{cases} \quad \text{(Equation 4)}$$

[Equation 5]

$$Sr_1 = \frac{\sqrt{\frac{1}{2}D_1 \times (t_1 - t_2)}}{\left(\frac{1}{3}(t_1 + 2t_2)\right)} \quad \text{(Equation 5)}$$

[Equation 6]

$$Sr_2 = \frac{\sqrt{\frac{1}{2}D_2 \times (t_2 - t_f)}}{\left(\frac{1}{3}(t_1 + 2t_f)\right)} \quad \text{(Equation 6)}$$

[Equation 7]

$$FT_1^{*} = \frac{(FT_1 - 910)}{10PE} \quad \text{(Equation 7)}$$

[Equation 8]

$$FT_2^{*} = \frac{(FT_2 - 928)}{20PE} \quad \text{(Equation 8)}$$

In these equations,

PE: converted value of recrystallization suppression effect by a precipitate forming element (unit: mass %), Ti: Ti content contained in the steel (unit: mass %), Nb: Nb content contained in the steel (unit: mass %).

$F_1$*: converted rolling reduction one stand before the final stand (unit: %), $F_2$*: converted rolling reduction in the final stand (unit: %), $F_1$: rolling reduction one stand before the final stand (unit: %), $F_2$: rolling reduction in the final stand (unit: %), $Sr_1$: rolled shape ratio one stand before the final stand (no unit), $Sr_2$: rolled shape ratio in the final stand (no unit), $D_1$: roll diameter one stand before the final stand (unit: mm), $D_2$: roll diameter in the final stand (unit: mm), $t_1$: sheet thickness at the start of rolling one stand before the final stand (unit: mm), $t_2$: sheet thickness at the start of rolling in the final stand (unit: mm), $t_f$: sheet thickness after finish rolling (unit: mm), $FT_1$*: converted rolling temperature one stand before the final stand (unit: ° C.), $FT_2$*: converted rolling temperature in the final stand (unit: ° C.), $FT_1$: rolling temperature one stand before the final stand (unit: ° C.), and $FT_2$: rolling temperature in the final stand (unit: ° C.).

are each shown.

However, in Equations 1 to 8, regarding the numbers such as 1 and 2 that are appended to variables as $F_1$ and $F_2$, in the final two stands of rolling in the multi-stand finish rolling, 1 is added to the variable related to rolling one stand before the final stand, and 2 is added to the variable related to rolling in the final stand. For example, in multi-stand finish rolling including seven stands of rolling in total, $F_1$ means the rolling reduction in the sixth stand of rolling counting from the rolling inlet side, and $F_2$ means the rolling reduction in the seventh stand of rolling.

Regarding the converted value PE of the recrystallization suppression effect by a precipitate forming element, the austenite pinning effect and the solute drug effect become apparent when the value of Ti+1.3 Nb is 0.02 or more. Therefore, in Equation 2, in a case where Ti+1.3Nb<0.02 is satisfied, PE=0.01, and in a case where Ti+1.3Nb>0.02 is satisfied, PE=Ti+1.3Nb−0.01.

Regarding the converted rolling reduction $F_1$* one stand before the final stand, the effect of the rolling reduction $F_1$ one stand before the final stand on the texture becomes apparent when the value of $F_1$ is 12 or more. Therefore, in Equation 3, in a case where $F_1<12$ is satisfied, $F_1^*=1.0$, and in a case where $F_1\geq 12$ is satisfied, $F_1^*=F_1-11$.

Regarding the converted rolling reduction $F_2$* in the final stand, the effect of the rolling reduction $F_2$ in the final stand on the texture becomes apparent when the value of $F_2$ is 11.1 or more. Therefore, in Equation 4, in a case where $F_2<11.1$ is satisfied, $F_2^*=0.1$, and in a case where $F_2\geq 11.1$ is satisfied, $F_2^*=F_2-11$.

Equation 1 shows preferable manufacturing conditions in finish rolling in which the rolling temperature $FT_2$ in the final stand is 930° C. or higher, and in a case where $FT_2$ is lower than 930° C., the value of the texture forming parameter co is meaningless. That is, $FT_2$ is 930° C. or higher and co is 110 or less.

(Finish Rolling Start Temperature being 1000° C. or Higher and 1150° C. or Lower)

When the finish rolling start temperature is lower than 1000° C., the recrystallization of the structure worked by rolling in the previous stands excluding the final two stands does not occur sufficiently, the texture in the steel sheet surface layer region develops, and thus it is not possible to make R/t, which is the average value of the minimum bend radii in the L axis and in the C axis/the sheet thickness, satisfy 1.5 or less.

Therefore, the finish rolling start temperature is preferably set to 1000° C. or higher. The finish rolling start temperature is more preferably 1050° C. or higher.

On the other hand, when the finish rolling start temperature is set to higher than 1150° C., the austenite grains become excessively coarse, and the toughness deteriorates. Therefore, the finish rolling start temperature is preferably set to 1150° C. or lower.

(Each Condition During Final Two Stands of Rolling in Multi-Stand Finish Rolling being Controlled and Finish Rolling being Performed Under Condition of Texture Forming Parameter ω Calculated by Equation 1 Becoming 110 or Less)

In the manufacturing of the steel sheet according to the present embodiment, the conditions for the final two stands of hot rolling in the multi-stand finish rolling are important.

The rolling reductions $F_1$ and $F_2$ at the time of the final two stands of rolling used to calculate ω defined by Equation 1 are numerical values expressing a difference in sheet thickness before and after rolling at each stand divided by the sheet thickness before rolling as a percentage. The diameters $D_1$ and $D_2$ of the rolling rolls are measured at room temperature, and it is not necessary to consider the flatness during hot rolling. In addition, the sheet thicknesses $t_1$ and $t_2$ on the rolling inlet side, and the sheet thickness $t_f$ after finish rolling may be measured on the spot using radiation or the like or may be obtained by calculation from a rolling force in consideration of deformation resistance and the like. The sheet thickness $t_f$ after finish rolling may be the final sheet thickness of the steel sheet after the completion of hot rolling. Regarding the rolling start temperatures $FT_1$ and $FT_2$, the values measured by a thermometer such as a radiation-type thermometer between the finish rolling stands may be used.

The texture forming parameter ω is an index in consideration of the rolling strain introduced into the entire steel sheet in the final two stands of finish rolling, the shear strain introduced into the surface layer region of the steel sheet, and the recrystallization rate after rolling, and means the tendency of forming a texture. When the final two stands of finish rolling are performed under a condition that the texture forming parameter ω exceeds 110, it is not possible to make the sum of the average pole density of the orientation group consisting of {211}<111> to {111}<112> and the pole density of the crystal orientation {110}<001> become 6.0 or less in the surface layer region. Therefore, the texture forming parameter co is preferably controlled to 110 or less. The texture forming parameter co is more preferably 98 or less.

(Rolling Temperature $FT_1$ One Stand Before Final Stand being 960° C. or Higher and 1020° C. or Lower)

When the rolling temperature $FT_1$ one stand before the final stand is lower than 960° C., the recrystallization of the structure worked by rolling does not sufficiently occur and the texture in the surface layer region cannot be controlled within the above-described range. Therefore, the rolling temperature $FT_1$ is set to 960° C. or higher. On the other hand, when the rolling temperature $FT'_1$ is higher than 1020° C., the formation state or recrystallization behavior of the worked structure changes due to the coarsening of the austenite grains or the like, and thus the texture in the surface layer region cannot be controlled within the above-described range. Therefore, the rolling temperature $FT_1$ is set to 1020° C. or lower.

(Rolling Reduction $F_1$ One Stand Before Final Stand being More than 11.0% and 23.0% or Less)

When the rolling reduction $F_1$ one stand before the final stand is 11.0% or less, the amount of strain introduced into the steel sheet by rolling becomes insufficient, recrystallization does not occur sufficiently, and the texture in the surface layer region cannot be controlled within the above-described range. Therefore, the rolling reduction $F_1$ is set to more than 11.0%. On the other hand, when the rolling reduction $F_1$ is more than 23.0%, the lattice defects in the crystals become excessive, and the recrystallization behavior changes, and thus the texture in the surface layer region cannot be controlled within the above-described range. Therefore, the rolling reduction $F_1$ is set to 23.0% or less.

The rolling reduction $F_1$ (%) is calculated as follows.

$$F_1=(t_1-t_2)/t_1\times 100$$

(Rolling Temperature $FT_2$ in Final Stand being 930° C. or Higher and 995° C. or Lower)

When the rolling temperature $FT_2$ in the final stand is set to lower than 930° C., the recrystallization rate of austenite significantly decreases, which makes it impossible to make the sum of the average pole density of the orientation group consisting of {211}<111> to {111}<112> and the pole density of the crystal orientation {110}<001> become 6.0 or less in the surface layer region. Therefore, the rolling temperature $FT_2$ is set to 930° C. or higher. On the other hand, when the rolling temperature $FT_2$ is higher than 995° C., the formation state or recrystallization behavior of the worked structure changes, and thus the texture in the surface layer region cannot be controlled within the above-described range. Therefore, the rolling temperature $FT_2$ is set to 995° C. or lower.

(Rolling Reduction $F_2$ of Final Stand being More than 11.0% and 22.0% or Less)

When the rolling reduction $F_2$ of the final stand is 11.0% or less, the amount of strain introduced into the steel sheet by rolling is insufficient, recrystallization does not occur sufficiently, and thus the texture in the surface layer region cannot be controlled within the above-described range. Therefore, the rolling reduction $F_2$ is set to more than 11.0%. On the other hand, when the rolling reduction $F_2$ is more than 22.0%, the lattice defects in the crystals become excessive, and the recrystallization behavior changes, and thus the texture in the surface layer region cannot be controlled within the above-described range. Therefore, the rolling reduction $F_2$ is set to 22.0% or less.

The rolling reduction $F_2$ is calculated as follows.

$$F_2=(t_2-t_f)/t_2\times 100$$

(Total Rolling Reduction $F_t$ of Final Three Stands being 35% or More)

The total rolling reduction $F_t$ of the final three stands is preferably as large as possible in order to promote the recrystallization of austenite. When the total rolling reduction $F_t$ of the final three stands is less than 35%, the recrystallization rate of austenite significantly decreases, which makes it impossible to make the sum of the average pole density of the orientation group consisting of {211}<111> to {111}<112> and the pole density of the crystal orientation {110}<001> become 6.0 or less in the surface layer region.

The total rolling reduction $F_t$ of the final three stands is calculated by the following equation.

$$F_t=(t_0-t_f)/t_0\times 100$$

Here, $t_0$ is the sheet thickness at the start of rolling two stands before the final stand (unit: mm).

In the finish rolling step, each of the above-described conditions is controlled in a simultaneous and inseparable manner. Regarding each of the above-described conditions, it is not enough to satisfy any one condition alone, and the texture in the surface layer region can be controlled within the above-described range by satisfying each of the above-described conditions at the same time.

Subsequent to the finish rolling, the cooling step and the coiling step are performed. Controlling the cooling rate after the finish rolling and, furthermore, performing a heat treatment under controlled conditions contribute to the control of the uniformity of hardness.

<Cooling Step>

(Cooling from 800° C. to 450° C. at Average Cooling Rate of 60° C./Sec or Faster)

In the cooling step, the hot-rolled steel sheet after the finish rolling is cooled to a coiling temperature to be described below in a manner that the average cooling rate from 800° C. to 450° C. becomes 60° C./sec or faster. This is to suppress excessive formation of ferrite or pearlite in the temperature range of 800° C. to 450° C. Since transformation is less likely to occur in a temperature range of 800° C. or higher, the cooling rate is not specified in the temperature range; however, in an usual hot rolling facility, since a steel sheet is reached to cooling zone within several seconds after the completion of the finish rolling, the realistic retention time at 800° C. or higher is 5 seconds or shorter from the completion of the finish rolling. On the other hand, since the temperature range of 800° C. to 450° C. is a temperature range where transformation occurs, the hot-rolled steel sheet is cooled at an average cooling rate of 60° C./sec or faster. When the cooling stop temperature is higher than 450° C. or the average cooling rate is slower than 60° C./sec, ferrite, pearlite, or the like is formed in the cooling process, 70% or more of martensite, tempered martensite, and bainite in total cannot be secured, and there is a case where it is not possible to satisfy both the strength and the bending workability. Since there is almost no concern that ferritic or pearlitic transformation may occur at temperatures of 450° C. or lower, it is not necessary to specify the cooling rate in the temperature range.

<Coiling Step>

The hot-rolled steel sheet after the hot rolling may be coiled into a coil shape. When the coiling temperature is higher than 450° C., ferrite, pearlite, or the like is formed, and there is a case where it is not possible to secure 70 volume % or more of martensite, tempered martensite, and bainite in total. Therefore, the coiling temperature is set to 450° C. or lower.

<Pickling Step>

The hot-rolled steel sheet after the cooling step or the coiling step may be pickled. Pickling makes it possible to improve the plating property in the subsequent manufacturing steps or enhance the chemical convertibility in vehicle manufacturing steps.

In addition, when a hot-rolled steel sheet in which scale is attached is subjected to light rolling reduction, the scale exfoliates and is pressed in, which generates a defect in some cases. Therefore, before light rolling reduction to be described below is performed, first, pickling is performed on the hot-rolled steel sheet. Pickling conditions are not particularly limited, but it is usual to perform pickling with hydrochloric acid, sulfuric acid, or the like containing an inhibitor.

<Light Rolling Reduction Step>

Although a light rolling reduction step is not essential, reduction may be applied at a rolling reduction of 20% or less in order for high-strengthening by the introduction of dislocations.

However, when the rolling reduction exceeds 20%, not only is the effect saturated, but the recovery of introduced dislocations also becomes insufficient, and significant deterioration of the elongation is caused. Due to these facts, in the case of performing the reduction, the rolling reduction is preferably set to 20% or less. As the reduction, reduction of 20% or less may be performed in one pass or reduction may be performed a plurality of divided times such that the cumulative rolling reduction becomes 20% or less.

<Heat Treatment Step>

(Retention for 10 Seconds or Longer in Temperature Range of 200° C. or Higher and Lower than 450° C.)

A heat treatment is performed by reheating the hot-rolled steel sheet after the light rolling reduction step to a temperature range of 200° C. to lower than 450° C. and retaining the hot-rolled steel sheet in this temperature range for 10 seconds or longer.

This heat treatment makes it possible to increase the volume percentage of residual austenite in the microstructure to 5% or more and to increase the concentration of solid solution carbon in residual austenite to 0.5 mass % or more.

When the heat treatment temperature is lower than 200° C. or the retention time is shorter than 10 seconds, a sufficient austenite volume percentage or concentration of solid solution carbon cannot be secured.

In addition, when the heat treatment temperature becomes 450° C. or higher, the strength is significantly decreased, and it becomes impossible to achieve a tensile strength of 980 MPa or more.

The upper limit of the retention time does not need to be specified and may be determined in consideration of the soaking property and economic rationality according to the heating method. For example, in the case of using a heat treatment facility where the steel sheet is transferred, the realistic upper limit is approximately 1000 seconds for the purpose of shortening the facility occupancy time; however, in the case of a box-type heating apparatus, the hot-rolled steel sheet may be heated for several hours to several tens of hours as a sufficient time to make the temperature inside the coil uniform.

The retention time means the time during which the steel sheet is within the temperature range of 200° C. or higher and lower than 450° C. after reheating, and, as long as the steel sheet stays in this temperature range for a predetermined time, the temperature may change in the middle.

Cooling after the heat treatment (after the temperature drops to lower than 200° C.) is not particularly specified.

<Plating Step>

The steel sheet according to the present embodiment can be obtained by a manufacturing method including the above-described steps. However, in a case where the steel sheet according to the present embodiment is made into a hot-dip galvanized steel sheet or hot-dip galvannealing for the purpose of improving the corrosion resistance, it is preferable to perform hot-dip galvanizing on the hot-rolled steel sheet after the heat treatment step. Since galvanizing contributes to improvement in corrosion resistance, in the case of applying the steel sheet to uses where corrosion resistance is expected, it is desirable to perform galvanizing. The galvanizing is preferably hot-dip galvanizing. The conditions of the hot-dip galvanizing are not particularly limited, and the hot-dip galvanizing may be performed under well-known conditions.

In addition, a galvannealed steel sheet can be manufactured by alloying the hot-rolled steel sheet after the hot-dip galvanizing (hot-dip galvanized steel sheet). The galvannealed steel sheet is capable of imparting an effect such as improvement in spot weldability or improvement in sliding ability during reduction in area forming in addition to improvement in the corrosion resistance, and thus the alloying may be performed depending on uses.

The above-described hot-dip galvanizing and hot-dip galvannealing may be performed after the steel sheet is once cooled to room temperature after the heat treatment at 200° C. or higher and lower than 450° C. or may be performed without cooling the steel sheet.

Even when Al plating, plating containing Mg or electro plating is performed in addition to the galvanizing, the steel sheet to the present embodiment can be manufactured.

Examples

Hereinafter, the hot-rolled steel sheet according to the present invention will be described more specifically with reference to examples. Here, the following examples are examples of the hot-rolled steel sheet of the present invention, and the hot-rolled steel sheet of the present invention is not limited to the following aspects. Conditions in examples to be described below are exemplary conditions adopted to confirm the feasibility and effects of the present invention, and the present invention is not limited to these exemplary conditions. The present invention is capable of adopting a variety of conditions within the scope of the gist of the present invention as long as the object of the present invention is achieved.

Steels having a chemical composition shown in Table 1 were cast, after the casting, reheated as they were or reheated after once cooled to room temperature, and heated to a temperature range shown in Table 2. After that, slabs were rough-rolled at temperatures of 1100° C. or higher to the sheet thicknesses of the rough-rolled sheets shown in Table 2, thereby manufacturing rough-rolled sheets.

Next, the obtained rough-rolled sheets were subjected to multi-stand finish rolling including seven stands in total. In the multi-stand finish rolling step, finish rolling was started from the rolling start temperatures shown in Table 2, and the rough-rolled sheets were rolled to sheet thicknesses $t_0$ in the rolling of the fifth stand shown in Table 3 by a total of four stands of rolling excluding the final three stands of rolling from the start of the rolling.

After that, hot rolling of the final two stands was performed under each condition shown in Table 2 to Table 4, and then cooling and coiling were performed. The final sheet thicknesses of the steel sheets after the completion of the hot rolling were regarded as the sheet thicknesses $t_f$ after the finish rolling.

After the hot-rolled steel sheets obtained as described above were pickled, light rolling reduction and heat treatments were performed on some of the hot-rolled steel sheets under the conditions shown in Table 4.

Furthermore, after that, hot-dip galvanizing (GI) or hot-dip galvannealing (GA) was performed on some of the hot-rolled steel sheets as shown in Table 4. The plating bath temperature was set to 445° C., and the hot-rolled steel sheets were retained at 445° C. for 10 seconds at the time of alloying.

TABLE 1

| Steel | Chemical composition (unit: mass %, remainder: Fe and impurities) | | | | | | | | | | | | | | | | | | |
|---|---|---|---|---|---|---|---|---|---|---|---|---|---|---|---|---|---|---|---|
| kind | C | Si | Mn | S | P | Al | N | Ti | Nb | V | Ni | Cu | Cr | Mo | W | B | REM | Ca | Mg | Si + Al |
| A | 0.20 | 1.50 | 2.20 | 0.001 | 0.010 | 0.050 | 0.003 | | | | | | | | | | | | | 1.6 |
| B | 0.25 | 1.00 | 1.50 | 0.001 | 0.010 | 0.020 | 0.002 | | | | | | | | | 0.0020 | | | | 1.0 |
| C | 0.28 | 2.30 | 2.80 | 0.001 | 0.008 | 0.020 | 0.003 | | | | | | | | | | | | | 2.3 |
| D | 0.20 | 0.50 | 2.60 | 0.002 | 0.010 | 0.500 | 0.002 | | | | | | | | | | | | | 1.0 |
| E | 0.20 | 1.60 | 2.50 | 0.002 | 0.010 | 0.020 | 0.002 | 0.10 | | | | | | | | | | | | 1.6 |
| F | 0.20 | 1.60 | 2.40 | 0.002 | 0.010 | 0.020 | 0.002 | | 0.05 | | | | | | | | | | | 1.6 |
| G | 0.20 | 1.50 | 2.50 | 0.002 | 0.010 | 0.020 | 0.002 | 0.10 | 0.02 | 0.002 | | | | | | | | | | 1.5 |
| H | 0.18 | 1.50 | 2.00 | 0.002 | 0.008 | 0.010 | 0.002 | | | | | 0.2 | 0.5 | 0.1 | | | | | | 1.5 |
| I | 0.25 | 1.30 | 2.30 | 0.001 | 0.010 | 0.033 | 0.003 | | | | 0.010 | | | | 0.010 | | 0.010 | 0.010 | 0.010 | 1.3 |
| J | 0.01 | 1.90 | 2.20 | 0.001 | 0.010 | 0.025 | 0.003 | | | | | | | | | | | | | 1.9 |
| K | 0.32 | 1.50 | 2.20 | 0.001 | 0.012 | 0.020 | 0.003 | | | | | | | | | | | | | 1.5 |
| L | 0.10 | 1.00 | 0.80 | 0.001 | 0.010 | 0.030 | 0.003 | | | | | | | | | | | | | 1.0 |
| N | 0.20 | 0.80 | 2.20 | 0.001 | 0.010 | 0.030 | 0.003 | | | | | | | | | | | | | 0.8 |
| M | 0.13 | 1.80 | 2.60 | 0.001 | 0.010 | 0.030 | 0.003 | | | | | | | | | | | | | 1.8 |

TABLE 2

| | | Sheet thickness | Sheet thickness of rough- | Slab heating | Rolling start | Hot rolling conditions | | | | |
|---|---|---|---|---|---|---|---|---|---|---|
| No. | Steel kind | ($t_f$) (mm) | rolled sheet (mm) | temperature (° C.) | temperature (° C.) | Ti (mass %) | Nb (mass %) | Ti + 1.3Nb (mass %) | $FT_1$ (° C.) | $FT_2$ (° C.) |
| 1 | A | 2.5 | 40 | 1250 | 1100 | 0.00 | 0.00 | 0.00 | 980 | 965 |
| 2 | B | 2.5 | 40 | 1250 | 1090 | 0.00 | 0.00 | 0.00 | 995 | 980 |
| 3 | C | 2.5 | 40 | 1250 | 1100 | 0.00 | 0.00 | 0.00 | 990 | 970 |
| 4 | D | 2.3 | 40 | 1250 | 1100 | 0.00 | 0.00 | 0.00 | 1000 | 980 |
| 5 | E | 2.3 | 40 | 1250 | 1100 | 0.10 | 0.00 | 0.10 | 998 | 978 |
| 6 | F | 3.2 | 40 | 1240 | 1140 | 0.00 | 0.05 | 0.07 | 1005 | 990 |
| 7 | G | 1.8 | 40 | 1280 | 1100 | 0.10 | 0.02 | 0.13 | 997 | 982 |
| 8 | H | 1.4 | 36 | 1220 | 1020 | 0.00 | 0.00 | 0.00 | 970 | 940 |
| 9 | I | 2.3 | 43 | 1250 | 1080 | 0.00 | 0.00 | 0.00 | 961 | 931 |
| 10 | J | 2.5 | 40 | 1250 | 1100 | 0.00 | 0.00 | 0.00 | 990 | 965 |
| 11 | K | 2.5 | 40 | 1250 | 1100 | 0.00 | 0.00 | 0.00 | 990 | 975 |
| 12 | L | 2.2 | 40 | 1250 | 1100 | 0.00 | 0.00 | 0.00 | 990 | 965 |
| 14 | A | 2.5 | 40 | 1250 | 1100 | 0.00 | 0.00 | 0.00 | 960 | 940 |
| 15 | A | 2.5 | 30 | 1250 | 1100 | 0.00 | 0.00 | 0.00 | 965 | 940 |
| 16 | A | 2.5 | 50 | 1250 | 1100 | 0.00 | 0.00 | 0.00 | 963 | 938 |
| 17 | A | 2.5 | 40 | 1250 | 980 | 0.00 | 0.00 | 0.00 | 965 | 935 |
| 18 | A | 2.5 | 40 | 1250 | 1100 | 0.00 | 0.00 | 0.00 | 955 | 935 |
| 19 | A | 2.5 | 40 | 1250 | 1100 | 0.00 | 0.00 | 0.00 | 1030 | 935 |
| 20 | A | 2.5 | 40 | 1250 | 1100 | 0.00 | 0.00 | 0.00 | 980 | 925 |
| 21 | A | 2.5 | 40 | 1250 | 1100 | 0.00 | 0.00 | 0.00 | 1015 | 1005 |
| 22 | A | 2.5 | 40 | 1250 | 1100 | 0.00 | 0.00 | 0.00 | 980 | 940 |
| 23 | A | 2.5 | 40 | 1250 | 1100 | 0.00 | 0.00 | 0.00 | 970 | 945 |
| 24 | A | 2.5 | 40 | 1250 | 1100 | 0.00 | 0.00 | 0.00 | 980 | 940 |
| 25 | A | 2.5 | 40 | 1250 | 1100 | 0.00 | 0.00 | 0.00 | 970 | 945 |
| 26 | A | 2.2 | 40 | 1250 | 1100 | 0.00 | 0.00 | 0.00 | 990 | 950 |
| 27 | A | 2.2 | 40 | 1250 | 1100 | 0.00 | 0.00 | 0.00 | 1000 | 950 |
| 28 | A | 2.2 | 40 | 1250 | 1100 | 0.00 | 0.00 | 0.00 | 1000 | 950 |
| 29 | A | 2.2 | 40 | 1250 | 1100 | 0.00 | 0.00 | 0.00 | 1000 | 950 |
| 30 | A | 2.2 | 40 | 1250 | 1100 | 0.00 | 0.00 | 0.00 | 1000 | 950 |
| 31 | E | 2.3 | 40 | 1250 | 1100 | 0.10 | 0.00 | 0.10 | 965 | 935 |
| 32 | E | 2.3 | 40 | 1250 | 1100 | 0.10 | 0.00 | 0.10 | 970 | 940 |
| 33 | E | 2.3 | 40 | 1250 | 1100 | 0.10 | 0.00 | 0.10 | 960 | 940 |
| 34 | I | 2.3 | 43 | 1250 | 1080 | 0.00 | 0.00 | 0.00 | 961 | 931 |
| 35 | N | 2.5 | 40 | 1250 | 1100 | 0.00 | 0.00 | 0.00 | 985 | 968 |
| 36 | M | 2.3 | 40 | 1250 | 1060 | 0.00 | 0.00 | 0.00 | 990 | 970 |
| 37 | C | 2.2 | 40 | 1250 | 1100 | 0.00 | 0.00 | 0.00 | 980 | 950 |
| 38 | A | 2.5 | 40 | 1250 | 1140 | 0.00 | 0.00 | 0.00 | 970 | 940 |

TABLE 3

| | Hot rolling conditions | | | | | | | | | | | |
|---|---|---|---|---|---|---|---|---|---|---|---|---|
| No. | $t_0$ (mm) | $t_1$ (mm) | $D_1$ (mm) | $Sr_1$ | $t_2$ (mm) | $D_2$ (mm) | $Sr_2$ | $F_1$ (%) | $F_2$ (%) | $F_t$ (%) | Average cooling rate from 800° C. to 450° C. (° C./s) | Coiling temperature (° C.) |
| 1 | 4.80 | 3.70 | 730 | 5.40 | 2.90 | 800 | 4.80 | 21.6 | 13.8 | 48 | 80 | 400 |
| 2 | 4.83 | 3.70 | 730 | 5.40 | 2.90 | 800 | 4.80 | 21.6 | 13.8 | 48 | 70 | 350 |
| 3 | 4.70 | 3.70 | 730 | 4.94 | 3.00 | 800 | 5.30 | 18.9 | 16.7 | 47 | 100 | 350 |
| 4 | 4.60 | 3.50 | 730 | 5.76 | 2.70 | 800 | 5.20 | 22.9 | 14.8 | 50 | 100 | 200 |
| 5 | 4.60 | 3.60 | 730 | 5.57 | 2.80 | 800 | 5.73 | 22.2 | 17.9 | 50 | 70 | 20 |
| 6 | 5.00 | 4.50 | 730 | 3.96 | 3.80 | 800 | 4.56 | 15.6 | 15.8 | 36 | 70 | 20 |
| 7 | 3.50 | 2.80 | 730 | 5.48 | 2.30 | 800 | 7.19 | 17.9 | 21.7 | 49 | 70 | 400 |
| 8 | 2.80 | 2.20 | 730 | 7.24 | 1.70 | 800 | 7.30 | 22.7 | 17.6 | 50 | 80 | 400 |
| 9 | 4.00 | 3.10 | 730 | 4.26 | 2.70 | 800 | 5.20 | 12.9 | 14.8 | 43 | 80 | 350 |
| 10 | 4.70 | 3.60 | 730 | 4.62 | 3.00 | 800 | 5.30 | 16.7 | 16.7 | 47 | 80 | 400 |
| 11 | 4.70 | 3.50 | 730 | 4.27 | 3.00 | 800 | 5.30 | 14.3 | 16.7 | 47 | 80 | 440 |
| 12 | 4.00 | 3.30 | 730 | 4.55 | 2.80 | 800 | 6.45 | 15.2 | 21.4 | 45 | 80 | 400 |
| 14 | 4.75 | 3.25 | 1000 | 4.74 | 2.85 | 1000 | 5.06 | 12.3 | 12.3 | 47 | 80 | 400 |
| 15 | 4.80 | 3.25 | 1000 | 4.81 | 2.84 | 1000 | 4.99 | 12.6 | 12.0 | 48 | 60 | 400 |
| 16 | 4.95 | 3.25 | 1000 | 4.81 | 2.84 | 1000 | 4.99 | 12.6 | 12.0 | 49 | 60 | 350 |
| 17 | 4.90 | 3.80 | 730 | 5.45 | 2.95 | 800 | 5.06 | 22.4 | 15.3 | 49 | 70 | 400 |
| 18 | 4.80 | 3.60 | 730 | 5.10 | 2.90 | 800 | 4.80 | 19.4 | 13.8 | 48 | 70 | 400 |
| 19 | 4.80 | 3.70 | 730 | 5.40 | 2.90 | 800 | 4.80 | 21.6 | 13.8 | 48 | 60 | 350 |
| 20 | 4.80 | 3.50 | 730 | 4.77 | 2.90 | 800 | 4.80 | 17.1 | 13.8 | 48 | 70 | 400 |
| 21 | 4.90 | 3.70 | 730 | 5.40 | 2.90 | 800 | 4.80 | 21.6 | 13.8 | 49 | 70 | 350 |
| 22 | 5.20 | 4.80 | 730 | 7.45 | 2.90 | 800 | 4.80 | 39.6 | 13.8 | 52 | 70 | 400 |
| 23 | 4.00 | 3.20 | 730 | 3.49 | 2.90 | 800 | 4.80 | 9.4 | 13.8 | 38 | 80 | 400 |
| 24 | 4.90 | 3.80 | 730 | 3.90 | 3.30 | 800 | 6.47 | 13.2 | 24.2 | 49 | 70 | 380 |
| 25 | 4.00 | 3.20 | 730 | 4.12 | 2.80 | 800 | 4.21 | 12.5 | 10.7 | 38 | 80 | 370 |
| 26 | 4.00 | 3.30 | 730 | 5.10 | 2.70 | 800 | 5.98 | 18.2 | 18.5 | 45 | 50 | 370 |
| 27 | 4.00 | 3.30 | 730 | 4.55 | 2.80 | 800 | 6.45 | 15.2 | 21.4 | 45 | 70 | 550 |
| 28 | 4.20 | 3.50 | 730 | 5.27 | 2.80 | 800 | 6.45 | 20.0 | 21.4 | 48 | 70 | 300 |
| 29 | 4.20 | 3.50 | 730 | 5.27 | 2.80 | 800 | 6.45 | 20.0 | 21.4 | 48 | 70 | 300 |
| 30 | 4.20 | 3.30 | 730 | 5.10 | 2.70 | 800 | 5.98 | 18.2 | 18.5 | 48 | 70 | 300 |
| 31 | 4.50 | 3.30 | 950 | 5.82 | 2.70 | 950 | 5.66 | 18.2 | 14.8 | 49 | 70 | 20 |
| 32 | 4.50 | 3.30 | 950 | 6.44 | 2.60 | 950 | 4.97 | 21.2 | 11.5 | 49 | 70 | 20 |
| 33 | 4.50 | 3.30 | 1050 | 6.12 | 2.70 | 1050 | 5.96 | 18.2 | 14.8 | 49 | 70 | 20 |
| 34 | 3.30 | 2.93 | 730 | 4.12 | 2.59 | 800 | 4.49 | 11.6 | 11.2 | 30 | 80 | 400 |
| 35 | 4.70 | 3.70 | 730 | 5.17 | 2.95 | 800 | 5.06 | 20.3 | 15.3 | 47 | 80 | 350 |
| 36 | 4.50 | 3.60 | 730 | 5.10 | 2.90 | 800 | 6.20 | 19.4 | 20.7 | 49 | 80 | 350 |
| 37 | 4.50 | 3.30 | 730 | 4.55 | 2.80 | 800 | 6.45 | 15.2 | 21.4 | 51 | 50 | 350 |
| 38 | 4.70 | 3.20 | 1000 | 4.68 | 2.82 | 1000 | 4.85 | 11.9 | 11.3 | 47 | 80 | 400 |

TABLE 4

| | Light rolling reduction | Values calculated using condition equations | | | Heat treatment conditions | | |
|---|---|---|---|---|---|---|---|
| No. | Rolling reduction (%) | $FT_1$* (° C.) | $FT_2$* (° C.) | Texture forming parameter ω | Heating temperature (° C.) | Retention time (s) | Plating kind |
| 1 | 0 | 700 | 185 | 5 | 400 | 100 | Not plated |
| 2 | 0 | 850 | 260 | 3 | 440 | 200 | Not plated |
| 3 | 0 | 800 | 210 | 4 | 350 | 300 | GA |
| 4 | 0 | 900 | 260 | 4 | 300 | 100000 | Not plated |
| 5 | 0 | 98 | 28 | 34 | 350 | 21600 | Not plated |
| 6 | 0 | 173 | 56 | 16 | 350 | 3600 | GI |
| 7 | 0 | 75 | 23 | 51 | 440 | 400 | Not plated |
| 8 | 0 | 600 | 60 | 16 | 440 | 30 | Not plated |
| 9 | 0 | 510 | 15 | 43 | 400 | 200 | Not plated |
| 10 | 0 | 800 | 185 | 5 | 400 | 100 | Not plated |
| 11 | 0 | 800 | 235 | 5 | 400 | 100 | Not plated |
| 12 | 0 | 800 | 185 | 6 | 400 | 100 | Not plated |
| 14 | 5 | 500 | 60 | 18 | 400 | 100 | GA |
| 15 | 0 | 550 | 60 | 18 | 400 | 100 | Not plated |
| 16 | 0 | 530 | 50 | 20 | 400 | 100 | Not plated |
| 17 | 0 | 550 | 35 | 18 | 400 | 100 | Not plated |
| 18 | 0 | 450 | 35 | 18 | 400 | 100 | Not plated |
| 19 | 0 | 1200 | 35 | 17 | 400 | 70 | Not plated |
| 20 | 0 | 700 | — | — | 400 | 100 | Not plated |
| 21 | 0 | 1050 | 385 | 3 | 400 | 100 | Not plated |
| 22 | 0 | 700 | 60 | 11 | 440 | 100 | Not plated |
| 23 | 0 | 600 | 85 | 13 | 440 | 50 | Not plated |

TABLE 4-continued

| | Light rolling reduction | Values calculated using condition equations | | | Heat treatment conditions | | |
|---|---|---|---|---|---|---|---|
| No. | Rolling reduction (%) | $FT_1$* (° C.) | $FT_2$* (° C.) | Texture forming parameter ω | Heating temperature (° C.) | Retention time (s) | Plating kind |
| 24 | 0 | 700 | 60 | 15 | 440 | 100 | Not plated |
| 25 | 0 | 600 | 85 | 38 | 440 | 50 | Not plated |
| 26 | 0 | 800 | 110 | 7 | 440 | 50 | Not plated |
| 27 | 0 | 900 | 110 | 8 | 440 | 100 | Not plated |
| 28 | 0 | 900 | 110 | 8 | 100 | 100 | Not plated |
| 29 | 0 | 900 | 110 | 8 | 500 | 100 | Not plated |
| 30 | 0 | 900 | 110 | 7 | 400 | 5 | Not plated |
| 31 | 0 | 61 | 4 | 186 | 350 | 100 | Not plated |
| 32 | 0 | 67 | 7 | 160 | 350 | 100 | Not plated |
| 33 | 0 | 56 | 7 | 126 | 350 | 100 | Not plated |
| 34 | 0 | 510 | 15 | 118 | 440 | 21600 | Not plated |
| 35 | 0 | 750 | 200 | 4 | 400 | 100 | Not plated |
| 36 | 0 | 800 | 210 | 5 | 300 | 20 | Not plated |
| 37 | 0 | 700 | 110 | 8 | 440 | 100 | Not plated |
| 38 | 0 | 600 | 60 | 27 | 400 | 50 | GA |

For each of the obtained hot-rolled steel sheets, the microstructure in a range of ⅛ to ⅜ of the sheet thickness (⅛ thickness to ⅜ thickness) from the surface in which a position of a ¼ depth (¼ thickness) of the sheet thickness from the surface was centered was observed by the above-described method, and the volume percentages of martensite (FM), tempered martensite (t-M), bainite (B), residual austenite (γ), ferrite (a), and pearlite (P) were obtained by the above-described method.

In addition, for each of these hot-rolled steel sheets, in a surface layer region that was a range from the surface to a position at 1/10 of the sheet thickness, the sum of the average pole density of an orientation group consisting of {211}<111> to {111}<112> and the pole density of a crystal orientation of {110}<001> was obtained by the above-described method.

In addition, for each of these hot-rolled steel sheets, the concentration of solid solution carbon in residual austenite was obtained.

Furthermore, for each of these hot-rolled steel sheets, a strip-shaped test piece was cut out from a ½ position in the width direction of the hot-rolled steel sheet, bending was performed according to JIS Z 2248: 2006 (V block 90° bending test) on both a bend where the bending ridge was parallel to the rolling direction (L direction) (L-axis bending) and a bend where the bending ridge was parallel to the direction perpendicular to the rolling direction (C direction) (C-axis bending), cracks initiated in the inside bend were investigated, and the limit bend R/t was obtained.

When R/t was 1.5 or less, the hot-rolled steel sheet was determined to be excellent in terms of the bending workability.

In addition, a JIS No. 5 tensile test piece was collected such that a direction perpendicular to the rolling direction became the tensile direction, a tensile test was performed according to JIS Z 2241: 2011, and the tensile strength (TS) and the total elongation (EL) were measured. In a case where the product of the tensile strength TS (MPa) and EL (%) was 19000 (MPa·%) or more and the total elongation EL was 16.0% or more, the hot-rolled steel sheet was determined to be excellent in terms of the elongation.

The individual results are shown in Table 5 and Table 6.

TABLE 5

| No. | Sum of average pole density of orientation groups consisting of {211}<111> to {111}<112> and pole density of crystal orientation of {110}<001> | Structure fractions (volume %) t-M | B | FM | α | P | γ | t-M + B + FM | Amount of solid solution carbon in austenite (mass %) |
|---|---|---|---|---|---|---|---|---|---|
| 1 | 2.5 | 12.0 | 65.0 | 0.0 | 10.0 | 0.0 | 13.0 | 77.0 | 0.7 |
| 2 | 2.3 | 40.0 | 40.0 | 0.0 | 0.0 | 5.0 | 15.0 | 80.0 | 0.7 |
| 3 | 2.2 | 67.0 | 10.0 | 5.0 | 0.0 | 0.0 | 18.0 | 82.0 | 0.6 |
| 4 | 2.0 | 71.0 | 5.0 | 15.0 | 0.0 | 0.0 | 9.0 | 91.0 | 0.6 |
| 5 | 3.5 | 69.0 | 0.0 | 20.0 | 0.0 | 0.0 | 11.0 | 89.0 | 0.6 |
| 6 | 3.2 | 69.0 | 0.0 | 20.0 | 0.0 | 0.0 | 11.0 | 89.0 | 0.6 |
| 7 | 3.8 | 59.0 | 30.0 | 0.0 | 0.0 | 0.0 | 11.0 | 89.0 | 0.6 |
| 8 | 3.3 | 63.0 | 25.0 | 0.0 | 0.0 | 0.0 | 12.0 | 88.0 | 0.8 |
| 9 | 3.9 | 45.0 | 46.0 | 0.0 | 0.0 | 0.0 | 9.0 | 91.0 | 0.6 |
| 10 | 2.5 | 19.0 | 65.0 | 0.0 | 12.0 | 0.0 | 4.0 | 84.0 | 0.3 |
| 11 | 2.6 | 3.0 | 65.0 | 0.0 | 10.0 | 20.0 | 2.0 | 68.0 | 0.3 |
| 12 | 2.7 | 8.0 | 22.0 | 0.0 | 67.0 | 0.0 | 3.0 | 30.0 | 0.3 |
| 14 | 4.4 | 14.0 | 64.0 | 0.0 | 10.0 | 0.0 | 12.0 | 78.0 | 0.7 |
| 15 | 6.5 | 15.0 | 65.0 | 0.0 | 8.0 | 0.0 | 12.0 | 80.0 | 0.7 |
| 16 | 6.3 | 13.0 | 70.0 | 0.0 | 5.0 | 0.0 | 12.0 | 83.0 | 0.7 |
| 17 | 6.4 | 14.0 | 64.0 | 0.0 | 10.0 | 0.0 | 12.0 | 78.0 | 0.7 |
| 18 | 6.2 | 12.0 | 68.0 | 0.0 | 10.0 | 0.0 | 10.0 | 80.0 | 0.7 |
| 19 | 6.1 | 11.0 | 68.0 | 0.0 | 10.0 | 0.0 | 11.0 | 79.0 | 0.7 |
| 20 | 6.3 | 7.0 | 68.0 | 0.0 | 15.0 | 0.0 | 10.0 | 75.0 | 0.7 |

TABLE 5-continued

| No. | Sum of average pole density of orientation groups consisting of {211}<111> to {111}<112> and pole density of crystal orientation of {110}<001> | Structure fractions (volume %) t-M | B | FM | α | P | γ | t-M + B + FM | Amount of solid solution carbon in austenite (mass %) |
|---|---|---|---|---|---|---|---|---|---|
| 21 | 6.3 | 9.0 | 66.0 | 0.0 | 15.0 | 0.0 | 10.0 | 75.0 | 0.7 |
| 22 | 6.1 | 15.0 | 60.0 | 0.0 | 15.0 | 0.0 | 10.0 | 75.0 | 0.7 |
| 23 | 6.2 | 19.0 | 60.0 | 0.0 | 12.0 | 0.0 | 9.0 | 79.0 | 0.7 |
| 24 | 6.3 | 17.0 | 58.0 | 0.0 | 15.0 | 0.0 | 10.0 | 75.0 | 0.7 |
| 25 | 6.3 | 17.0 | 62.0 | 0.0 | 12.0 | 0.0 | 9.0 | 79.0 | 0.7 |
| 26 | 2.6 | 29.0 | 30.0 | 0.0 | 30.0 | 5.0 | 6.0 | 59.0 | 0.7 |
| 27 | 2.6 | 14.0 | 30.0 | 0.0 | 45.0 | 10.0 | 1.0 | 44.0 | 0.7 |
| 28 | 2.6 | 10.0 | 75.0 | 0.0 | 8.0 | 1.0 | 6.0 | 85.0 | 0.4 |
| 29 | 2.5 | 13.0 | 75.0 | 0.0 | 8.0 | 3.0 | 1.0 | 88.0 | 0.4 |
| 30 | 2.6 | 17.0 | 73.0 | 0.0 | 8.0 | 1.0 | 1.0 | 90.0 | 0.4 |
| 31 | 6.3 | 71.0 | 0.0 | 19.0 | 0.0 | 0.0 | 10.0 | 90.0 | 0.6 |
| 32 | 6.4 | 73.0 | 0.0 | 17.0 | 0.0 | 0.0 | 10.0 | 90.0 | 0.6 |
| 33 | 6.3 | 72.0 | 0.0 | 18.0 | 0.0 | 0.0 | 10.0 | 90.0 | 0.6 |
| 34 | 6.4 | 63.0 | 25.0 | 0.0 | 0.0 | 0.0 | 12.0 | 88.0 | 0.8 |
| 35 | 2.6 | 11.0 | 75.0 | 0.0 | 10.0 | 0.0 | 4.0 | 86.0 | 0.7 |
| 36 | 2.3 | 83.0 | 10.0 | 0.0 | 0.0 | 0.0 | 7.0 | 93.0 | 0.8 |
| 37 | 2.6 | 34.0 | 30.0 | 0.0 | 20.0 | 10.0 | 6.0 | 64.0 | 0.7 |
| 38 | 4.2 | 16.0 | 64.0 | 0.0 | 8.0 | 0.0 | 12.0 | 80.0 | 0.7 |

TABLE 6

| No. | Characteristics Tensile strength TS (MPa) | Total elongation EL (%) | Limit bend R/t | TS × EL (MPa · %) | Note |
|---|---|---|---|---|---|
| 1 | 1048 | 21 | 0.8 | 22008 | Invention Example |
| 2 | 1201 | 17 | 1.0 | 20417 | Invention Example |
| 3 | 1106 | 19 | 1.0 | 21014 | Invention Example |
| 4 | 1222 | 16 | 1.0 | 19552 | Invention Example |
| 5 | 1195 | 16 | 1.0 | 19120 | Invention Example |
| 6 | 1195 | 16 | 1.0 | 19120 | Invention Example |
| 7 | 1330 | 18 | 1.2 | 23940 | Invention Example |
| 8 | 1130 | 17 | 1.0 | 19210 | Invention Example |
| 9 | 1310 | 16 | 1.4 | 20960 | Invention Example |
| 10 | 735 | 25 | 0.8 | 18375 | Comparative Example |
| 11 | 835 | 14 | 1.6 | 11690 | Comparative Example |
| 12 | 593 | 25 | 0.8 | 14825 | Comparative Example |
| 14 | 1060 | 21 | 1.2 | 22260 | Invention Example |
| 15 | 1041 | 21 | 1.6 | 21861 | Comparative Example |
| 16 | 1061 | 20 | 1.6 | 21220 | Comparative Example |
| 17 | 1045 | 21 | 1.8 | 21945 | Comparative Example |
| 18 | 1043 | 20 | 1.8 | 20860 | Comparative Example |
| 19 | 1038 | 20 | 1.7 | 20760 | Comparative Example |
| 20 | 1035 | 20 | 1.8 | 20700 | Comparative Example |
| 21 | 1039 | 20 | 1.8 | 20780 | Comparative Example |
| 22 | 1045 | 19 | 1.8 | 19855 | Comparative Example |
| 23 | 1043 | 20 | 1.7 | 20860 | Comparative Example |
| 24 | 1051 | 19 | 1.8 | 19969 | Comparative Example |
| 25 | 1052 | 18 | 1.7 | 18936 | Comparative Example |
| 26 | 880 | 22 | 1.0 | 19360 | Comparative Example |
| 27 | 785 | 23 | 1.0 | 18055 | Comparative Example |
| 28 | 965 | 13 | 1.8 | 12545 | Comparative Example |
| 29 | 955 | 13 | 1.7 | 12415 | Comparative Example |
| 30 | 966 | 13 | 1.8 | 12558 | Comparative Example |
| 31 | 1175 | 16 | 1.6 | 18800 | Comparative Example |
| 32 | 1178 | 16 | 1.6 | 18848 | Comparative Example |
| 33 | 1185 | 15 | 1.6 | 17775 | Comparative Example |
| 34 | 1313 | 17 | 1.8 | 22321 | Comparative Example |
| 35 | 1095 | 15 | 1.1 | 16425 | Comparative Example |
| 36 | 1000 | 21 | 1.0 | 21000 | Invention Example |
| 37 | 1015 | 19 | 1.7 | 19285 | Comparative Example |
| 38 | 1025 | 20 | 1.2 | 20500 | Invention Example |

As is clear from Table 1 to Table 6, Nos. 1 to 9, 14, 36, and 38, which were the present invention examples, had a tensile strength of 980 MPa or more and were excellent in terms of the bending workability and the elongation.

On the other hand, in Comparative Examples Nos. 10 to 12, 15 to 35, and 37 in which one or more of the chemical composition, the microstructure, the sum of the pole densities, and the solid solution carbon content in austenite were outside the scope of the present invention, any of the tensile strength, the bending workability, and the elongation failed to reach the target values.

The invention claimed is:

1. A hot-rolled steel sheet comprising, as a chemical composition, by mass %:
C: 0.02% to 0.30%;
Si: 0.01% to 2.50%;
Mn: 1.00% to 3.00%;
P: 0.100% or less;
S: 0.0001% to 0.0100%;
Al: 0.005% to 1.000%;
N: 0.010% or less;
Ti: 0% to 0.20%;
Nb: 0% to 0.20%;
V: 0% to 0.200%;
Ni: 0% to 2.00%;
Cu: 0% to 2.00%;
Cr: 0% to 2.00%;
Mo: 0% to 2.00%;
W: 0% to 0.100%;
B: 0% to 0.0100%;
REM: 0% to 0.0300%;
Ca: 0% to 0.0300%;
Mg: 0% to 0.0300%; and
a remainder of Fe and impurities,
wherein the chemical composition satisfies Si+Al≥1.00%,
a microstructure includes, by volume percentage, 70% or more of martensite, tempered martensite, and bainite in total and 5% to 20% of residual austenite,
in a surface layer region that is a range from a surface to a position at 1/10 of a sheet thickness, a sum of an average pole density of an orientation group consisting of {211}<111> to {111}<112> and a pole density of a crystal orientation of {110}<001> is 6.0 or less,
a concentration of solid solution carbon in the residual austenite is 0.5 mass % or more, and
a tensile strength is 980 MPa or more.

2. The hot-rolled steel sheet according to claim 1, comprising, as the chemical composition, by mass %, one or more selected from:

Ti: 0.001% to 0.20%;
Nb: 0.001% to 0.20%;
V: 0.001% to 0.200%;
Ni: 0.01% to 2.00%;
Cu: 0.01% to 2.00%;
Cr: 0.01% to 2.00%;
Mo: 0.01% to 2.00%;
W: 0.005% to 0.100%;
B: 0.0005% to 0.0100%;
REM: 0.0003% to 0.0300%;
Ca: 0.0003% to 0.0300%; and
Mg: 0.0003% to 0.0300%.

3. The hot-rolled steel sheet according to claim 1, further comprising:

a hot-dip galvanized layer on the surface.

4. The hot-rolled steel sheet according to claim 2, further comprising:

a hot-dip galvanized layer on the surface.

5. The hot-rolled steel sheet according to claim 3, wherein the hot-dip galvanized layer is a hot-dip galvannealed layer.

6. The hot-rolled steel sheet according to claim 4, wherein the hot-dip galvanized layer is a hot-dip galvannealed layer.

* * * * *